United States Patent [19]

Uranishi et al.

[11] Patent Number: 4,701,198
[45] Date of Patent: * Oct. 20, 1987

[54] FUEL TANK FOR USE IN A MOTOR VEHICLE

[75] Inventors: Koji Uranishi, Susono; Takaaki Ito, Mishima; Toshio Tanahashi, Susono, all of Japan

[73] Assignee: Toyota Jidosha Kabushiki Kaisha, Toyota, Japan

[*] Notice: The portion of the term of this patent subsequent to Feb. 25, 2003 has been disclaimed.

[21] Appl. No.: 715,159

[22] Filed: Mar. 22, 1985

[30] Foreign Application Priority Data

| Mar. 24, 1984 | [JP] | Japan | 59-55236 |
| Mar. 24, 1984 | [JP] | Japan | 59-55238 |
| Mar. 24, 1984 | [JP] | Japan | 59-55241 |
| Mar. 26, 1984 | [JP] | Japan | 59-56154 |

[51] Int. Cl.⁴ .................. B01D 53/04; B01D 53/14; B65D 90/28; F16K 24/04
[52] U.S. Cl. .................. 55/387; 123/519; 137/587; 220/85 VR; 220/85 VS; 220/86 R; 280/5 A; 296/1 C
[58] Field of Search ............ 220/85 VR, 85 VS, 85 S, 220/86 R; 137/587, 588; 55/387, 182; 280/5 R, 5 A; 123/519, 518, 516; 296/1 C

[56] References Cited

U.S. PATENT DOCUMENTS

| 3,104,777 | 9/1963 | Pottash | 220/86 R |
| 3,467,274 | 9/1969 | Schmitt | 220/86 R |
| 3,477,611 | 11/1969 | Niles . | |
| 3,478,922 | 11/1969 | Mole . | |
| 3,633,609 | 1/1972 | Benner et al. | 220/86 R X |
| 3,728,846 | 4/1973 | Nilsson | 220/86 R X |
| 3,748,829 | 7/1973 | Joyce et al. | 220/86 R X |
| 3,854,911 | 12/1974 | Walker | 220/85 VS X |
| 3,907,153 | 9/1975 | Mutty | 220/86 R |
| 3,911,977 | 10/1975 | Berger | 220/86 R X |
| 3,937,357 | 2/1976 | Burgess | 220/203 |
| 4,044,913 | 8/1977 | Brunnert | 220/86 R |
| 4,142,647 | 3/1979 | Walters | 220/85 VS X |
| 4,312,649 | 1/1982 | Fujit et al. | 220/DIG. 33 |
| 4,572,394 | 2/1986 | Tanahashi et al. | 220/85 VS X |

FOREIGN PATENT DOCUMENTS 163298 8/1933 Switzerland .................. 220/86 R

Primary Examiner—Allan N. Shoap
Attorney, Agent, or Firm—Finnegan, Henderson, Farabow, Garrett & Dunner

[57] ABSTRACT

A fuel tank comprising a fuel inlet pipe and a cap detachably attached to the fuel inlet of the fuel inlet pipe. A valve port interconnecting the interior of the fuel tank to a canister is formed in the fuel inlet pipe. A control valve controlling the opening operation of the valve port is arranged in the fuel inlet pipe. The control valve is normally closed. When the cap is slightly unscrewed, the control valve automatically opens, and the fuel vapor in the fuel tank is fed into the canister via the valve port.

15 Claims, 10 Drawing Figures

FUEL TANK FOR USE IN A MOTOR VEHICLE

BACKGROUND OF THE INVENTION

1. Field of the Invention

The present invention relates to a fuel tank for use in a motor vehicle.

2. Description of the Related Art

A motor vehicle driven by an internal combustion engine is normally equipped with a fuel tank. When it becomes necessary to replenish the fuel tank with fuel, the cap attached to the fuel inlet of the fuel tank must first be detached, to allow the insertion of a fuel pump nozzle. After the fuel pump nozzle is inserted into the fuel inlet of the fuel tank, fuel is fed into the fuel tank from the fuel pump nozzle. However, when the level of the fuel in the fuel tank is low, the space in the fuel tank above the surface of the liquid fuel is filled with a large amount of fuel vapor under pressure. Consequently, when the cap is detached from the fuel inlet of the fuel tank, the fuel vapor in the fuel tank is forced out of the fuel tank into the outside air, causing air pollution. In addition, when fuel is fed into the fuel tank from the fuel pump nozzle, the fuel spouted from the nozzle comes into violent contact with and agitates the fuel in the fuel tank, causing bubbles to form in the fuel in the fuel tank. The collapsing of these bubbles causes further amounts of fuel vapor to be generated in the fuel tank, and this fuel vapor flows out from the fuel inlet of the fuel tank, causing more air pollution.

SUMMARY OF THE INVENTION

An object of the present invention is to provide a fuel tank capable of preventing air pollution caused by the fuel vapor in the tank by preventing the fuel vapor in the fuel tank from flowing out to the outside air when the cap is detached from the fuel inlet of the fuel tank.

Thus, according to the present invention, there is provided a fuel tank for use in a motor vehicle, comprising: a fuel inlet pipe connected to the fuel tank and having a fuel inlet; a cap detachably attached to the fuel inlet; a canister containing an activated carbon; and, normally closed valve means controlling the vapor connection between an interior of the fuel tank and the canister and cooperating with the cap for connecting the interior of the fuel tank to the canister when the cap is detached from the fuel inlet.

The present invention may be more fully understood from the description of preferred embodiments of the invention set forth below, together with the accompanying drawings.

DESCRIPTION OF THE PREFERRED EMBODIMENTS

Figure 1:
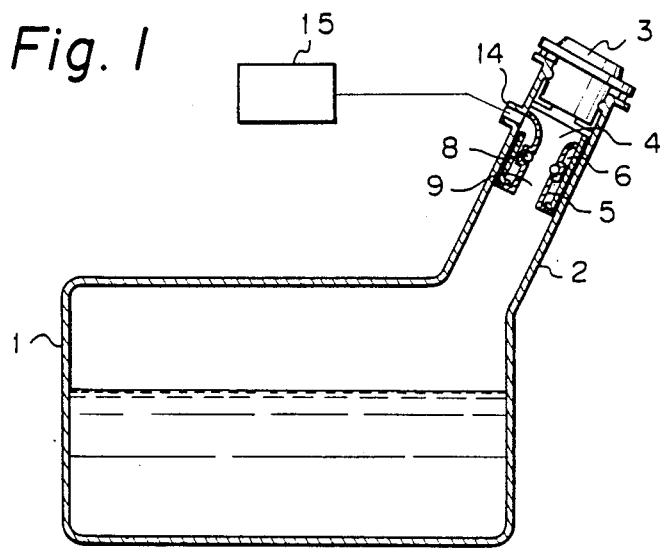
FIG. 1 is a cross-sectional side view of a first embodiment of a fuel tank according to the present invention.
Figure 2:
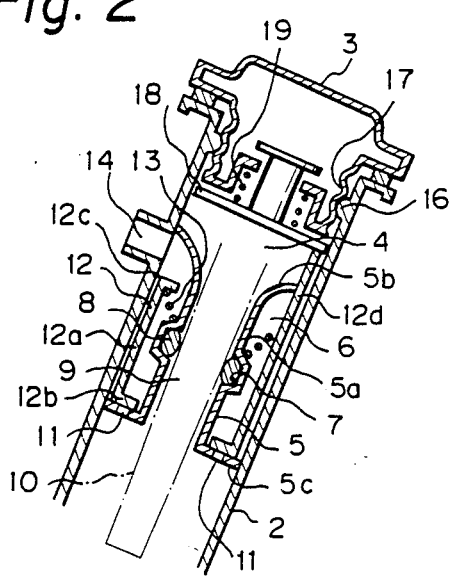
FIG. 2 is an enlarged cross-sectional side view of a portion of the fuel tank illustrated in FIG. 1.
Figure 3:
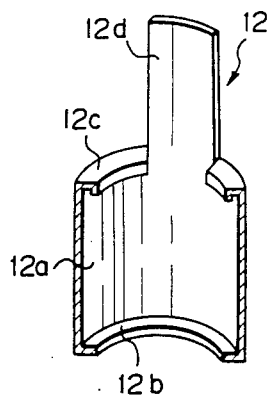
FIG. 3 is a perspective view of the control valve illustrated in FIG. 2, showing the control valve being cut along the axis thereof.

Referring to FIG. 1 illustrating a first embodiment of the present invention, reference numeral 1 designates a fuel tank, 2 a fuel inlet pipe, and 3 a cap detachably attached to a fuel inlet 4 of the fuel inlet pipe 2. Referring to FIGS. 1 and 2, a hollow cylindrical nozzle guide 5 is fixed to the inner wall of the fuel inlet pipe 2. This nozzle guide 5 comprises a hollow cylindrical portion 5a having a uniform cross-section, a funnel-shaped inlet end portion 5b diverging toward the cap 3, and an annular end plate 5c extending perpendicular to the axis of the fuel inlet pipe 2. A valve chamber 6 is formed between the nozzle guide 5 and the fuel inlet pipe 2. An annular groove 7 is formed on the central portion of the hollow cylindrical portion 5a, and a seal member 8 such as an O ring is fitted into the annular groove 7. The hollow cylindrical portion 5a forms therein a nozzle insertion passage 9 having a substantially uniform cross-section. As illustrated by the dash-dot line in FIG. 2, the fuel pump nozzle 10 is inserted into the nozzle insertion passage 9 when a fuel filling operation is to be carried out. The inner diameter of the seal member 8 is determined in such a manner that the seal member 8 comes into sealing contact with the outer wall of the fuel pump nozzle 10 when the fuel pump nozzle 10 is inserted into the nozzle insertion passage 9. Valve ports 11 are formed on the annular end plate 5c of the nozzle guide 5, and a control valve 12 for controlling the opening operation of the valve ports 11 is arranged in the valve chamber 6. As illustrated in FIGS. 2 and 3, the control valve 12 comprises a cylindrical portion 12a slidably arranged along the inner wall of the fuel inlet pipe 2, an annular lower end portion 12b functioning as a valve body for controlling the opening operation of the valve ports 11, an upper end bent portion 12c for retaining a spring, and a tongue portion 12d projecting upward beyond the funnel-shaped inlet end portion 5b. A compression spring 13 is inserted between the upper end bent portion 12c of the control valve 12 and the nozzle guide 5, and the control valve 12 is continuously biased upward due to the spring force of the compression spring 13. A fuel vapor outlet 14 is formed at the uppermost portion of the valve chamber 6 and connected to a canister 15 containing charcoal.

As illustrated in FIG. 2, inner threads 16 are formed on the inner wall of the fuel inlet 4 of the fuel inlet pipe 2, and outer threads 17 engageable with the inner threads 16 are formed on the outer wall of the cap 3. An abutment plate 18 engageable with the tip of the tongue portion 12d of the control valve 12 is mounted on the inner end face of the cap 3 in such a manner that the abutment plate 8 is slidably movable in the axial direction of the cap 3, and a compression spring 19 for continuously biasing the abutment plate 18 downward is inserted between the abutment plate 18 and the cap 3. The compression spring 19 has a spring force which is stronger than that of the compression spring 13.

As illustrated in FIGS. 1 and 2, when the fuel inlet 4 is closed by the cap 3, the abutment plate 18 abuts against the tips of the tongue portion 12d of the control valve 12 and pushes down the control valve 12 and, thus, the valve ports 11 are closed by the annular lower end portion 12b of the control valve 12. At this time, the fuel vapor in the fuel tank 1 is not able to escape into the canister 15 and, thus, the interior of the fuel tank 1 is filled with the fuel vapor. When the cap 3 is slightly unscrewed in order to carry out the fuel filling operation, since the cap 3 moves upward, the control valve 12 also moves upward and, thus, the annular lower end portion 12b of the control valve 12 opens the valve ports 11. As a result, the fuel vapor in the fuel tank 1 is fed into the canister 15 via the valve ports 11, the valve chamber 6, and the fuel vapor outlet 14. Thus, when the cap 3 is further unscrewed and detached from the fuel inlet 4, since a large part of the fuel vapor in the fuel tank 1 has been fed into the canister 15, an extremely small amount of the fuel vapor flows out from the fuel inlet 4 to the outside air. Then, as illustrated in the dash-dot line in FIG. 2, the fuel pump nozzle 10 is inserted into the nozzle insertion passage 9, and fuel is fed into the fuel tank 1 from the fuel pump nozzle 10. The fuel spouted from the fuel pump nozzle 10 comes into violent contact with the fuel in the fuel tank 1, causing the fuel in the fuel tank 1 to bubble and vaporize. However, at this time, since the valve ports 11 are opened and, in addition, the interior of the fuel tank 1 is isolated from the outside air by the seal member 8, the fuel vapor generated in the fuel tank 1 is fed into the canister 15 via the valve ports 11. When the fuel tank is full, the fuel pump nozzle 10 is removed from the fuel inlet 4, and the cap 3 is screwed into the fuel inlet 4.

The fuel vapor fed into the canister 15 is absorbed by the activated carbon in the canister 15, and the fuel vapor absorbed by the activated carbon is drawn into the intake manifold (not shown) via the fuel vapor conduit (not shown) at a predetermined engine operating state.

Figure 4:
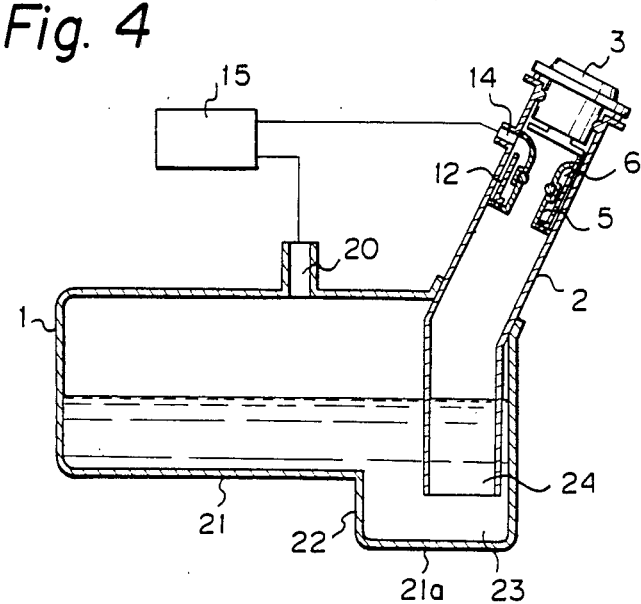
FIG. 4 is a cross-sectional side view of a second embodiment of a fuel tank according to the present invention.

FIG. 4 illustrates a second embodiment. In this embodiment, a fuel vapor outlet 20 is formed on the upper wall of the fuel tank 1 and connected to the canister 15. Consequently, the fuel vapor generated in the fuel tank 1 is fed into the canister 15. In addition, in this embodiment, a portion 21a of the lower wall 21 of the fuel tank 1 is expanded downward, and a small chamber 23 surrounded by the vertical wall 22 of the fuel tank 1 is formed above the expanded portion 21a. The fuel inlet pipe 2 extends downward in the fuel tank 1 to the interior of the small chamber 23, and the fuel outlet 24 of the fuel inlet pipe 2 is open to the interior of the small chamber 22. In this embodiment, the fuel vapor generated in the fuel tank 1 is continuously fed into the canister 15, and an extremely small amount of the fuel vapor in the fuel inlet pipe 2 is fed into the canister 15 via the valve chamber 6 when the cap 3 is unscrewed. Therefore, it is possible to reduce the volume of the canister 15 and thus minimize the size thereof. In addition, when the cap 3 is detached from the fuel inlet 4, a part of the fuel vapor in the fuel inlet pipe 2, which part has not been fed into the canister 15, flows out to the outside air and, thus, the amount of the fuel vapor flowing out to the outside air becomes extremely small. Furthermore, when the fuel is fed into the fuel tank 1 from the fuel pump nozzle 10, only the fuel in the small chamber 23 is agitated and forms bubbles. Consequently, the amount of fuel vapor generated by this bubbling is small and, thus, the amount of the fuel vapor flowing out to the outside air when the fuel pump nozzle 10 is removed (FIG. 2) becomes extremely small.

In the first embodiment and the second embodiment, when the cap 3 is slightly unscrewed in order to carry out the fuel filling operation, the valve ports 11 interconnecting the interior of the fuel tank 1 to the canister 15 automatically open, and the fuel vapor in the fuel tank 1 is fed into the canister 15. Consequently, the amount of fuel vapor flowing out from the fuel inlet 4 to the outside air when the cap 3 is detached is extremely small and, thus, it is possible to prevent air pollution caused by the fuel vapor.

Figure 5:
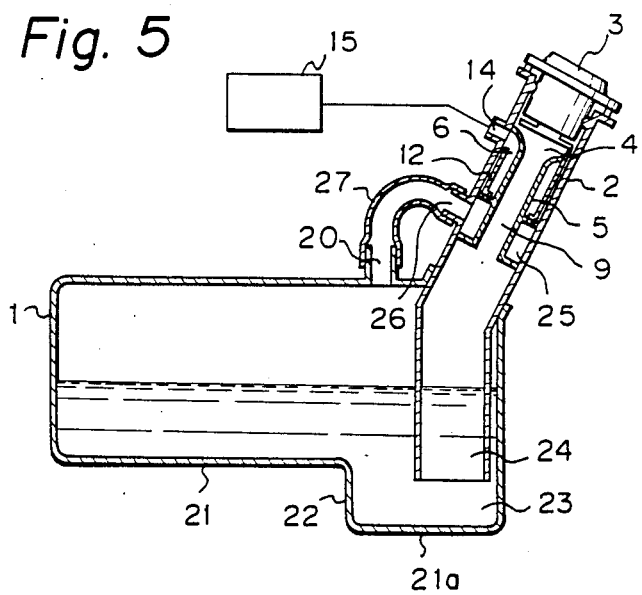
FIG. 5 is a cross-sectional side view of a third embodiment of a fuel tank according to the present invention.
Figure 6:
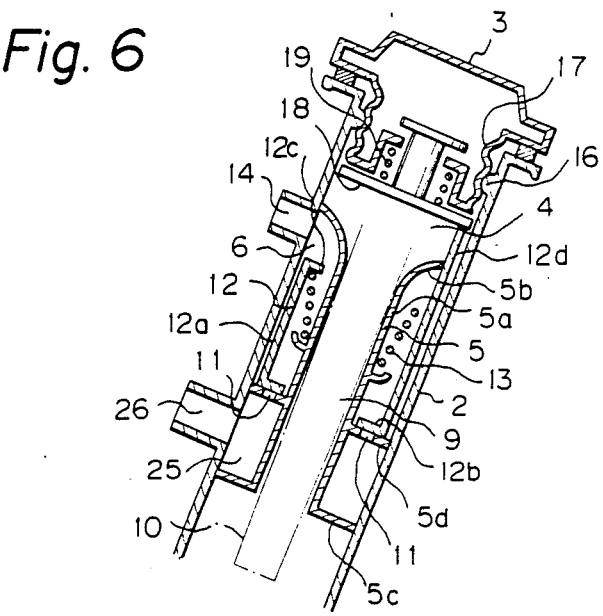
FIG. 6 is an enlarged cross-sectional side view of a portion of the fuel tank illustrated in FIG. 5.

FIGS. 5 and 6 illustrate a third embodiment. In this embodiment, an annular separating wall 5d is formed between the fuel inlet pipe 2 and the nozzle guide 5, and the annular space formed between the fuel inlet pipe 2 and the nozzle guide 5 is divided into the valve chamber 6 and an annular passage 25. The valve ports 11 are formed on the separating wall 5d and, thus, the annular passage 25 is connected to the valve chamber 6 via the valve ports 11. The annular passage 25 has a fuel vapor inlet 26, and the fuel vapor outlet 20 formed on the upper wall of the fuel tank 1 is connected to the fuel vapor inlet 26 via a connecting tube 27.

In this embodiment, when the cap 3 is slightly unscrewed, the annular lower end portion 12b of the control valve 12 opens the valve ports 11. At this time, the fuel vapor in the fuel tank 1 flows into the annular passage 25 via the connecting tube 27 and is then fed into the canister 15 via the valve ports 11, valve chamber 6, and the fuel vapor outlet 14. Thus, when the cap 3 is detached, an extremely small amount of the fuel vapor in the fuel inlet pipe 2 flows out from the fuel inlet 4 to the outside air. Then, the fuel is fed from the fuel pump nozzle 10 into the small chamber 23. At this time, if the small chamber 23 is filled with fuel, the fuel fed from the fuel pump nozzle 10 comes into violent contact with the fuel located in the fuel inlet pipe 2. Consequently, at this time, only the fuel located in the fuel inlet pipe 2 forms bubbles and vaporizes and, thus, the amount of the fuel vapor generated by bubbling is small. Where the fuel remains only in the bottom portion of the small chamber 23, the entire amount of fuel in the small chamber 23 bubbles and vaporizes when the fuel is fed from the fuel pump nozzle 10. However, the volume of the small chamber 23 is small and, thus, the amount of fuel vapor generated by the bubbling is small. Consequently, the amount of fuel vapor flowing out from the fuel inlet 4 to the outside air when the fuel pump nozzle 10 is removed from the fuel inlet 4 is small.

Figure 7:
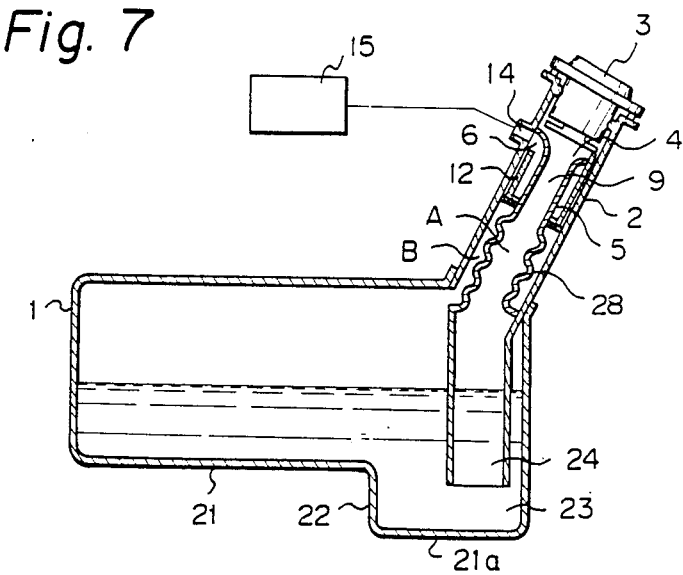
FIG. 7 is a cross-sectional side view of a fourth embodiment of a fuel tank according to the present invention.
Figure 8:
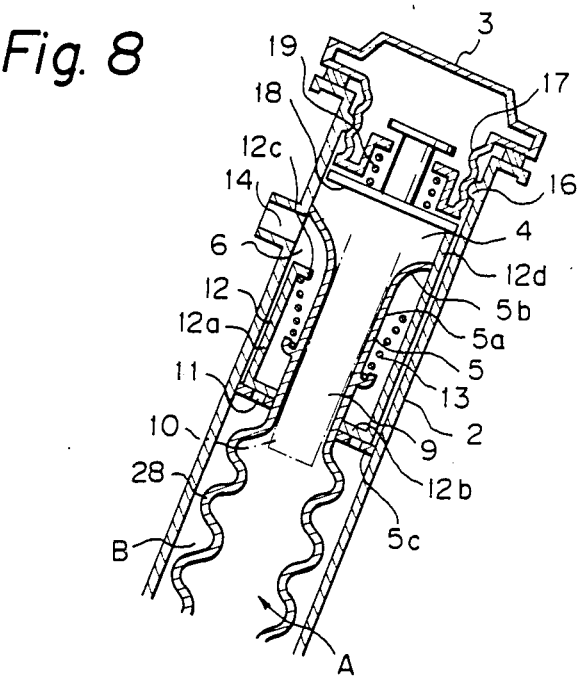
FIG. 8 is an enlarged cross-sectional side view of a portion of the fuel tank illustrated in FIG. 7.

FIGS. 7 and 8 illustrated a fourth embodiment. In this embodiment, a separating pipe 28 having a corrugated cross-section is connected to the inner edge of the annular end plate 5c of the nozzle guide 5, and the interior of the fuel inlet pipe 2 is divided into a central passage A and an annular fuel vapor passage B. The central passage A is aligned with the nozzle insertion passage 9, and the separating pipe 28 has an inner diameter which is approximately equal to that of the nozzle guide 5. The annular fuel passage B extends from the lower and plate 5c of the nozzle guide 5 to the upper space of the fuel tank 1.

In this embodiment, when the cap 3 is slightly unscrewed in order to carry out the fuel filling operation, the annular lower end portion 12b of the control valve 12 opens the valve ports 11. At this time, the fuel vapor in the fuel tank 1 is fed into the canister 15 via the fuel vapor passage A, the valve ports 11, the valve chamber 6, and the fuel vapor outlet 14. Then, the cap 3 is detached, and fuel is fed into the fuel tank 1 from the fuel pump nozzle 10. At this time, the fuel in the small chamber 23 is agitated, forms bubbles, and vaporizes, and the fuel vapor thus generated flows upward within the fuel tank 1 and then flows into the fuel vapor passage B. At this time, since the fuel spouted from the fuel pump nozzle 10 flows downward within the central passage A while in contact with the inner wall of the separating wall 28, the separating wall 28 is cooled by the fuel spouted from the fuel pump nozzle 10 and, thus, the fuel vapor flowing upward within the fuel vapor passage B is cooled by the separating wall 28. As a result, a part of the fuel vapor flowing within the fuel vapor passage B is condensed and returned to the fuel tank 1 in the form of liquid fuel.

Figure 9:
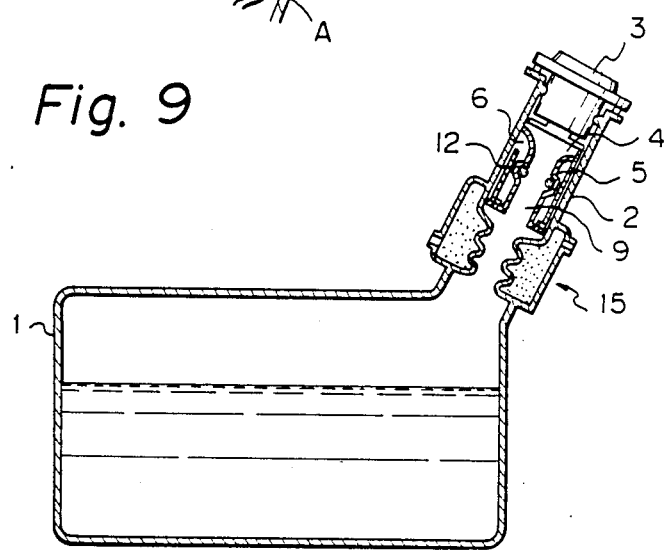
FIG. 9 is a cross-sectional side view of a fifth embodiment of a fuel tank according to the present invention.
Figure 10:
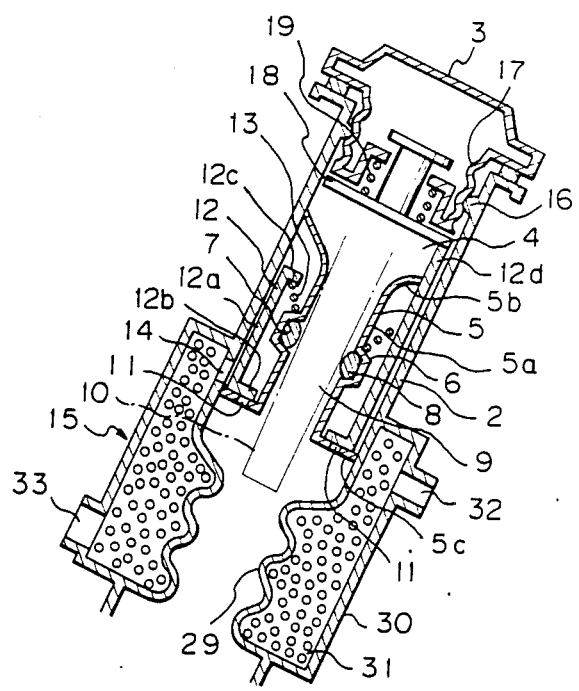
FIG. 10 is an enlarged cross-sectional side view of a portion of the fuel tank illustrated in FIG. 9.

FIGS. 9 and 10 illustrate a fifth embodiment. In this embodiment, the fuel inlet pipe 2 located around the valve ports 11 has a double-pipe construction which forms the canister 15 connected to the valve chamber 6 via the fuel vapor outlet 14. The canister 15 comprises an annular inner wall 29 projecting inward from the fuel inlet pipe 2 and having a corrugated cross section, and a cylindrical outer wall 30 projecting outward from the fuel inlet pipe 2. The annular inner wall 29 and the cylindrical outer wall 30 are formed integrally with the fuel, inlet pipe 2, and the space between the annular inner wall 29 and the cylindrical outer wall 30 is filled with activated carbon 31. The canister 15 has a purge port 32 and an atmosphere port 33 which is open to the outside air, and the purge port 32 is connected to the intake manifold of the engine (not shown).

In this embodiment, when the cap 3 is slightly unscrewed in order to carry out the fuel filling operation, the annular lower end portion 12b of the control valve 12 opens the valve ports 11 and, thus, the fuel vapor in the fuel tank 1 is fed into the canister 15 via the valve ports 11, the valve chamber 6, and the fuel vapor outlet 14. The fuel vapor fed into the canister 15 is absorbed by the activated carbon 31 in the canister 15 and, at this time, the activated carbon 31 is heated due to the heat stemming from the absorption. In the present invention, since a large amount of the fuel vapor is fed into the canister 15 for a short time when the cap 3 is unscrewed, the temperature of the canister 15 is relatively high. However, since the fuel spouted from the fuel pump nozzle 10 is in contact with the annular inner wall 20 of the canister 15 and is cooled, thereby, the canister 15 is also cooled and, thus, it is possible to prevent the temperature of the canister 15 from becoming too high. In this embodiment, since the canister 15 is formed integrally with the fuel inlet pipe 2, there is an advantage that a special conduit for feeding the fuel vapor into the canister 15 is not necessary and, thus, it is possible to simplify the construction of the vapor emission control system.

While the invention has been described by reference to specific embodiments chosen for purposes of illustration, it should be apparent that numerous modifications could be made thereto by those skilled in the art without departing from the basic concept and scope of the invention.

We claim:

1. A fuel tank for use in a motor vehicle, comprising:
   a fuel inlet pipe connected to the fuel tank and having a fuel inlet;
   a cap removably engaged within said fuel inlet;
   a nozzle guide disposed within said fuel inlet pipe, said nozzle guide including a substantially cylindrical portion spaced from said inlet pipe, said cylindrical portion and said fuel inlet pipe defining a substantially toroidally shaped valve chamber therebetween, said valve chamber including port means for transfering vapor between the fuel tank and said valve chamber;
   a cannister having activated carbon therein, said cannister being in vapor communication with said valve chamber; and
   valve means arranged in said valve chamber for controlling vapor communication between the fuel tank and said valve chamber, said valve means opening said port means when said cap is disengaged from said fuel inlet.

2. A fuel tank according to claim 1, wherein said cap is screwed into said fuel inlet, and the interior of said fuel tank is connected to said canister when said cap is slightly unscrewed.

3. A fuel tank according to claim 1, wherein said fuel inlet pipe extends to a bottom interior of said fuel tank.

4. A fuel tank according to claim 3, wherein said fuel tank has a small chamber expanding downward from a bottom wall of said fuel tank, said fuel inlet pipe extending to an interior of said small chamber.

5. A fuel tank according to claim 1, wherein said cap has an abutment plate resiliently supported by said cap and cooperating with said valve means.

6. A fuel tank according to claim 1, wherein an upper space of said fuel tank is connected to said canister.

7. A fuel tank for use in a motor vehicle, comprising:
   a fuel inlet pipe connected to the fuel tank and having a fuel inlet;
   a cap removably engaged within said fuel inlet;
   a canister having activated carbon therein;
   a substantially cylindrical nozzle guide disposed within said fuel inlet pipe, said fuel inlet pipe and said nozzle guide defining a valve chamber therebetween, said valve chamber including port means for transferring vapor between the fuel tank and said valve chamber, said valve chamber being in vapor communication with said canister, said nozzle guide having an annular lower end plate having a valve port which provides vapor communication between said fuel tank and said valve chamber and canister; and
   valve means slidably arranged in said valve chamber for controlling vapor communication through said valve port, said valve means including an annular lower end portion opposing said valve port, a compression spring for continuously biasing said annular lower end portion away from said valve port to provide vapor communication between the fuel tank and said canister, and a tongue portion projecting upwardly beyond said nozzle guide for engaging said cap to press said annular lower end portion aganist said valve port to prevent vapor communication between the fuel tank and said canister when said cap is engaged within said fuel inlet.

8. A fuel tank according to claim 7, wherein a hollow cylindrical inner pipe extending downward from an inner edge of said annular lower end plate is arranged in said fuel inlet pipe and divides an interior of said fuel inlet pipe into a central passage connecting said fuel inlet to the interior of said fuel tank and a fuel vapor passage connecting the interior of said fuel tank to said valve port.

9. A fuel tank according to claim 8, wherein said inner pipe extends to a bottom interior of said fuel tank.

10. A fuel tank according to claim 8, wherein said inner pipe has a corrugated cross section.

11. A fuel tank for use in motor vehicle, comprising:
a fuel inlet pipe connected to said fuel tank and having a fuel inlet;
a cap removably engaged within said fuel inlet;
a canister having activated carbon therein;
a substantially cylindrical nozzle guide disposed within said fuel inlet pipe, said fuel inlet pipe and said nozzle guide defining a valve chamber, said valve chamber being in vapor communication with said canister;
an annular separating wall arranged between said fuel inlet pipe and said nozzle guide and dividing a space between said fuel inlet pipe and said nozzle guide into said chamber and an annular passage connected to an upper space of said fuel tank, said separating wall having a valve port for providing vapor communication between said annular passage, said valve chamber, and canister;
valve means slidably arranged in said valve chamber and mounted within said fuel inlet pipe for controlling vapor communication through said valve port, said valve means including an annular lower end portion opposing said valve port, a compression spring for continuously biasing said annular lower end portion away from said valve port to provide for vapor communication between the fuel tank and said canister, and a tongue portion projecting upwardly beyond said nozzle guide for engaging said cap to press said annular lower end portion against said valve port to prevent vapor communication between the fuel tank and said canister when said cap is engaged with said fuel inlet.

12. A fuel tank for use in a motor vehicle, comprising:
a fuel inlet pipe connected to the fuel tank and having a fuel inlet;
a cap removably engaged within said fuel inlet;
a substantially cylindrical nozzle guide disposed within said fuel inlet pipe, said nozzle guide and fuel inlet pipe defining a valve chamber therebetween, said chamber including port means for transferring vapor between the fuel tank and said chamber;
a canister having activated carbon therein, said canister being in vapor communication with said valve chamber, said canister being formed by an annular inner wall and a cylindrical outer wall both of which are formed integrally with said fuel inlet pipe, said inner wall being arranged to be in contact with fuel fed from said fuel inlet;
valve means arranged in said valve chamber for controlling vapor communication between the fuel tank and said valve chamber, said valve means opening said port means when said cap is disengaged from said fuel inlet.

13. A fuel tank according to claim 12 wherein said inner wall has a corrugated cross section.

14. A fuel tank for use in a motor vehicle, comprising:
a fuel inlet pipe connected to the fuel tank and having a fuel inlet;
a cap removably engaged within said fuel inlet;
a substantially cylindrical nozzle guide disposed within said fuel inlet pipe, said nozzle guide having an annular groove formed on an inner wall thereof and a seal member fitted into said annular groove, said nozzle guide and said fuel inlet pipe defining a valve chamber therebetween, said valve chamber including port means for transfering vapor between the fuel tank and said valve chamber;
a cannister having activated carbon therein, said cannister being in vapor communication with said valve chamber; and
valve means arranged in said valve chamber for controlling vapor communication between the fuel tank and said valve chamber, said valve means opening said port means when said cap is disengaged from said fuel inlet.

15. A fuel tank for use in a motor vehicle, comprising:
a fuel inlet pipe connected to said fuel tank and having a fuel inlet;
a cap removably engaged within said fuel inlet;
a substantially cylindrical nozzle guide disposed within said fuel inlet pipe, said nozzle guide having a funnel-shaped inlet portion, said nozzle guide and said fuel inlet pipe defining a valve chamber therebetween, said valve chamber including port means for transfering vapor between the fuel tank and said valve chamber;
a cannister having activated carbon therein, said cannister being in vapor communication with said valve chamber; and
valve means arranged in said valve chamber for controlling vapor communication between the fuel tank and said valve chamber, said valve means opening said port means when said cap is disengaged from said fuel inlet.

* * * * *